(12) United States Patent
Holbein

(10) Patent No.: US 6,755,369 B2
(45) Date of Patent: Jun. 29, 2004

(54) BELT RETRACTOR COMPRISING A LOCKING PAWL ACTUATED BY AN ELECTROMAGNET

(75) Inventor: Wolfgang Holbein, Alfdorf (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/214,292

(22) Filed: Aug. 7, 2002

(65) Prior Publication Data

US 2003/0034416 A1 Feb. 20, 2003

(30) Foreign Application Priority Data

Aug. 20, 2001 (DE) ........................................ 201 13 779 U

(51) Int. Cl.[7] ............................................... B60R 22/40
(52) U.S. Cl. .......................................... 242/384; 280/806
(58) Field of Search .............................. 242/384, 384.1, 242/384.5, 384.6; 280/806; 297/478

(56) References Cited

U.S. PATENT DOCUMENTS

| | | | | |
|---|---|---|---|---|
| 3,952,966 A | * | 4/1976 | Burleigh | 242/384 |
| 4,008,864 A | * | 2/1977 | Torphammar et al. | 242/384 |
| 4,187,925 A | * | 2/1980 | Lindblad | 242/384 |
| 4,273,210 A | * | 6/1981 | Nitzbon | 242/384 |
| 4,688,825 A | * | 8/1987 | Arbogast et al. | 280/806 |
| 4,708,364 A | * | 11/1987 | Doty | 280/806 |
| 4,895,317 A | * | 1/1990 | Rumpf et al. | 242/384 |
| 5,026,093 A | * | 6/1991 | Nishikaji | 242/384.5 |
| 5,538,098 A | * | 7/1996 | Sparhawk | 280/806 |
| 5,779,178 A | * | 7/1998 | McCarty | 242/384 |

FOREIGN PATENT DOCUMENTS

| | | |
|---|---|---|
| DE | 2809395 A1 | 9/1979 |
| DE | 3629316 A1 | 3/1988 |
| DE | 19620236 A1 | 11/1996 |
| DE | 19602178 A1 | 2/1997 |

* cited by examiner

Primary Examiner—William A. Rivera
(74) Attorney, Agent, or Firm—Tarolli, Sundheim Covell & Tummino L.L.P.

(57) ABSTRACT

A belt retractor has a locking pawl actuated by an electromagnet. The electromagnet is operated with a holding power that is reduced in comparison to its actuation power. The holding power may be provided by a series device in the current supply of the electromagnet. The series device may generate a holding voltage that is limited to a predefined value, or it may provide a pulse duration modulated d.c. supply voltage.

6 Claims, 2 Drawing Sheets

BELT RETRACTOR COMPRISING A LOCKING PAWL ACTUATED BY AN ELECTROMAGNET

The present invention relates to a belt retractor comprising a locking pawl actuated by an electromagnet.

BACKGROUND OF THE INVENTION

In order to move the locking pawl from its resting position into the engaged position with the requisite speed and reliability, the electromagnet has to generate a substantial amount of force. For this purpose, it is dimensioned for the force needed to activate the locking pawl. If a current is applied to the electromagnet for a prolonged period of time, it heats up considerably. For the electromagnet to be able to generate the necessary actuation force and to withstand the thermal stress under continuous load, it must be quite large in size.

SUMMARY OF THE INVENTION

The invention reduces the load on the electromagnet so that it can be made smaller, as a result of which the volume and weight of the belt retractor are ultimately reduced.

According to the invention, the electromagnet is operated with a holding power that is reduced in comparison to its actuation power The actuation power for moving the locking pawl from its resting position into the engaged position is only provided for a short period of time, subsequently, it switches over to a reduced holding power. The criterion for switching over from the actuation power to the reduced holding power can be the lapsing of a predetermined period of time As an alternative, the heating up of the electromagnet is detected and the device switches over to the reduced holding power when a predetermined temperature is exceeded It is especially advantageous to detect the position of the locking pawl and, after the engaged position has been reached, to immediately switch over to the reduced holding power However, electric parameters, such as the current flowing through the magnetic coil, also provide information on the actuation procedure, so that these parameters are also options as a criterion.

Several embodiments are provided for operating the electromagnet with the reduced holding power.

According to a first embodiment, a voltage regulator reduces the voltage supplied to the electromagnet during the holding phase The voltage can also be reduced by means of pulse duration modulation According to another embodiment, the electromagnet is provided with two windings that can be actuated separately, one of them, which is provided as the holding winding, being more weakly dimensioned.

BRIEF DESCRIPTION OF THE DRAWINGS

Additional characteristics and advantages of the invention ensue from the description below of several embodiments and from the accompanying drawings to which reference is made. The drawings show the following.

DESCRIPTION OF THE PREFERRED EMBODIMENTS

Figure 1:
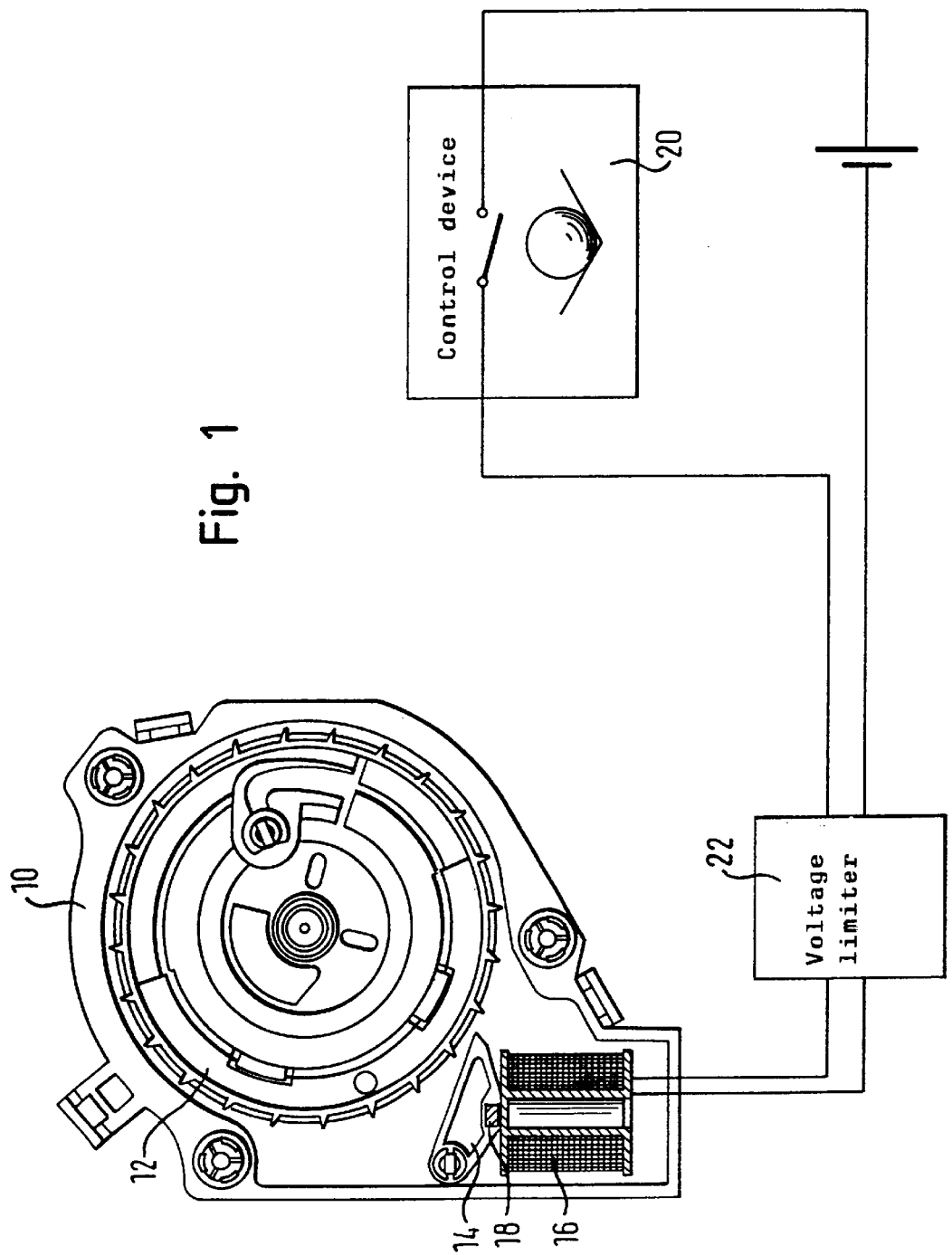
FIG. 1—a schematic view of a belt retractor with a locking pawl that can be actuated by an electromagnet and that is in its resting position, FIG. 2—a partial view of the belt retractor with the locking pawl actuated.
Figure 2:
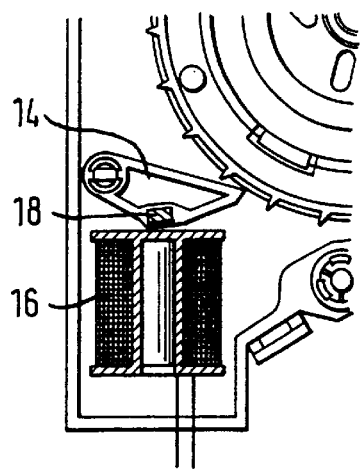

The belt retractor is shown in a schematic side view in FIG. 1 It comprises a frame 10 in which a belt spool is rotatably mounted On a face of the belt spool, there is a coupling disk 12 whose outer circumference has control teeth. On the frame 10, across from the circumference of the coupling disk 12, a locking pawl 14 is mounted so as to swivel. An electromagnet 16 serves to actuate the locking pawl 14. The electromagnet 16 interacts with a permanent magnet 18 that is situated in the locking pawl 14. A control device 20 applies an excitation current to the magnetic coil of the electromagnet 16. In the embodiment shown in FIG. 1, a voltage limiter 22 is installed between the magnetic coil of the electromagnet 16 and the control device 20. The voltage limiter 22 is a series device in the current circuit of the electromagnet by means of which the electric power supplied to said electromagnet is reduced The voltage limiter 22 limits the operating voltage of the electromagnet to a value that is independent of the fluctuating onboard voltage and that ensures a reliable engagement of the locking pawl 14 into the control teeth on the outer circumference of the coupling disk 12 As an alternative, the voltage limitation goes into effect as a function of predetermined criteria. The electric power supplied to the electromagnet 16 after the locking pawl has been actuated can also be reduced by means of pulse modulation FIG. 1 shows the locking pawl 14 in the resting position, FIG. 2 shows it in the engaged position.

Figure 3:
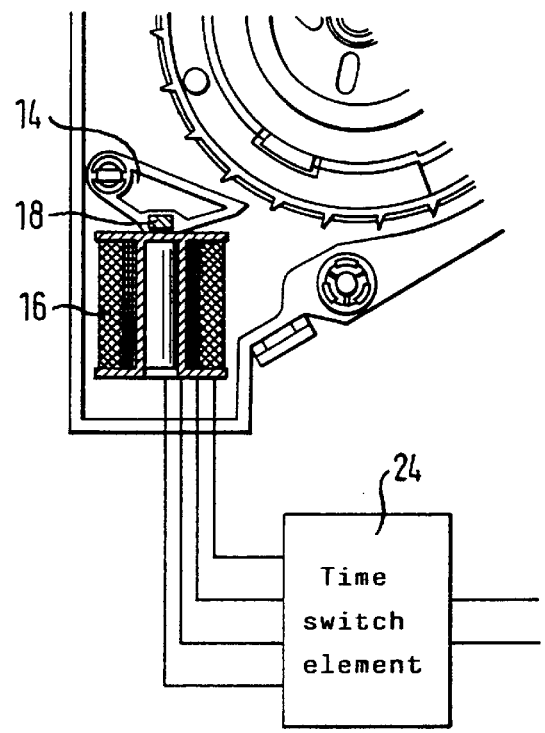
FIGS. 3, 4 and 5—partial views of three embodiments of the belt retractor.

In the embodiment shown in FIG. 3, the electromagnet 16 is provided with two separate windings. One of the two windings is an actuation winding through which a current flows, which is sufficient to reliably move the locking pawl 14 into the engaged position. The second winding is a holding winding through which a reduced holding current flows, which is sufficient to hold the locking pawl 14 in the engaged position After a predetermined period of time has lapsed, a time switch element 24 switches over from the actuation winding to the holding winding.

Figure 4:
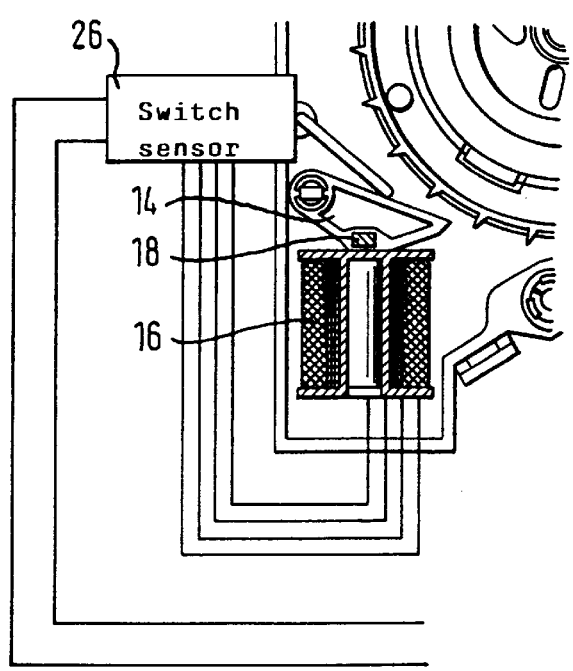

In the embodiment shown in FIG. 4, the position of the locking pawl 14 is detected by a switch sensor 26. Once the engaged position of the locking pawl 14 has been reached, the electromagnet 16 is switched over from the actuation winding to the holding winding.

Figure 5:
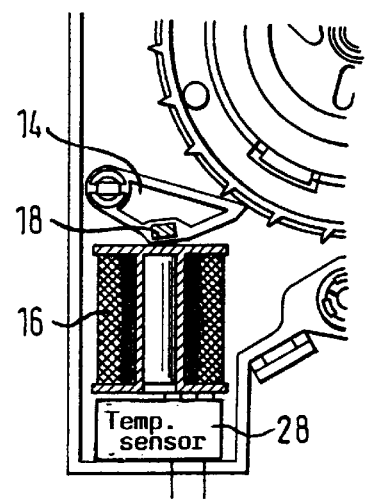

In the embodiment shown in FIG. 5, there is a temperature sensor 28 on the electromagnet 16. As soon as the temperature of the electromagnet exceeds a predetermined temperature, the device switches over to a reduced holding power.

What is claimed is:

1. A belt retractor comprising a locking pawl actuated by an electromagnet for moving the locking pawl from a resting position into an engaged position, wherein the electromagnet is operated with an electric holding power for folding the locking pawl in the engaged position that is reduced in comparison to electric power required for moving the locking pawl from a resting position into an engaged position.

2. The belt retractor according to claim 1, wherein the reduced holding power is provided by a series device connected in the current supply to the electromagnet.

3. The belt retractor according to claim 2, wherein the series device for reducing the holding power generates a holding voltage that is limited to a predefined value.

4. The belt retractor according to claim 2, wherein the series device for reducing the holding power applies to the electromagnet a pulse duration modulated d.c. voltage.

5. The belt retractor according to claim 1, wherein switching from actuating power to holding power depends on criterion including at least one of period of actuation time, heating up of the electromagnet, position of the locking pawl, electric parameters.

6. A belt retractor comprising a locking pawl actuated by an electromagnet, wherein the electromagnet is operated with an electric holding power that is reduced in comparison to electric power required for actuation of the locking pawl, the reduced holding power being provided by a series device connected in the current supply to the electromagnet, the electromagnet having a separate holding winding.

* * * * *

UNITED STATES PATENT AND TRADEMARK OFFICE
CERTIFICATE OF CORRECTION

PATENT NO.    : 6,755,369 B2
DATED         : June 29, 2004
INVENTOR(S)   : Wolfgang Holbein It is certified that error appears in the above-identified patent and that said Letters Patent is hereby corrected as shown below:

<u>Column 2,</u>
Line 66, after "for" change "folding" to -- holding --.

Signed and Sealed this

Second Day of November, 2004

JON W. DUDAS
*Director of the United States Patent and Trademark Office*